May 20, 1952 R. J. ALTGELT ET AL 2,597,608
SUBSURFACE AND SUBSOIL CULTIVATOR
Filed Aug. 25, 1945 2 SHEETS—SHEET 1

INVENTORS.
Rudolph J. Altgelt,
BY Cameron H. Gemberling,

John P. Smith
Atty.

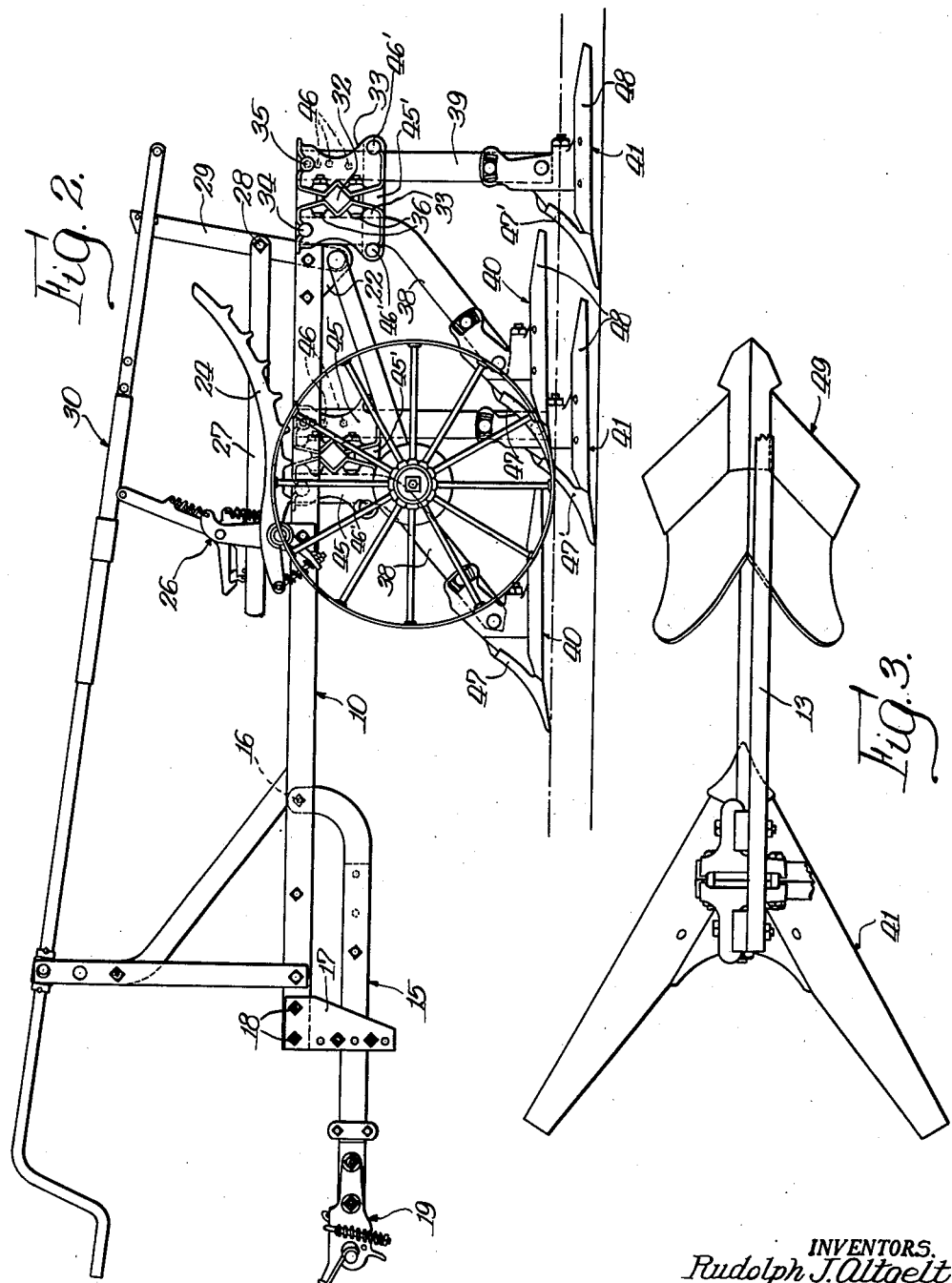

Patented May 20, 1952

2,597,608

UNITED STATES PATENT OFFICE 2,597,608

SUBSURFACE AND SUBSOIL CULTIVATOR

Rudolph J. Altgelt and Cameron H. Gemberling, South Bend, Ind., assignors to The Oliver Corporation, a corporation of Delaware Application August 25, 1945, Serial No. 612,634

3 Claims. (Cl. 97—78)

1

In arid regions throughout the country, various attempts have been made to eliminate or reduce to a minimum soil erosion and the retention and penetration of rain fall in the soil by employing subsurface cultivators so as to crumble the soil to a depth of approximately four inches below the surface of the ground and beneath the plant and crop stubble. This practice has not been found to be entirely satisfactory, especially in regions of limited rainfall because it frequently occurs that an almost impermeable layer of colloidal silt was found to form a few inches under the surface of the land defeating, to a considerable extent, soil conservation and crop production.

It is therefore one of the primary objects of the present invention to provide a combination subsurface and subsoil cultivator which will penetrate the ground to a sufficient extent so as to not only break up subsurface soil, but will also break up and disrupt the impermeable layer of colloidal silt for better wind erosion control and for better infiltration of rain water with the resultant increase of crop production.

A further object of the invention is to provide a novel and improved construction of a subsurface cultivator having subsoil sweeps in the form of diverging, substantially horizontally positioned blades or shares which are arranged laterally in staggered relation with respect to one another and with each of the subsoil sweeps in tandem relation with respect to its subsurface sweep so that the adjacent blades of each sweep overlap one another and thereby effect the cutting of the soil horizontally in two slices, namely an upper slice and a lower slice. This arrangement in effect crumbles the soil to a considerable depth, disrupts the layer of colloidal silt so as to afford ready absorption and retention of rain water to thereby reduce to a minimum land erosion and effect greater crop production.

These and other objects are accomplished by providing a construction and an arrangement of the various parts in the manner hereinafter described and particularly pointed out in the appended claims.

Referring to the drawings:

Fig. 2 is a side elevational view of the same; and

Fig. 3 is an enlarged top plan view of a modified form showing one unit of subsoil sweep in combination with a lister type base substituted for the subsurface sweep.

2

Figure 1:
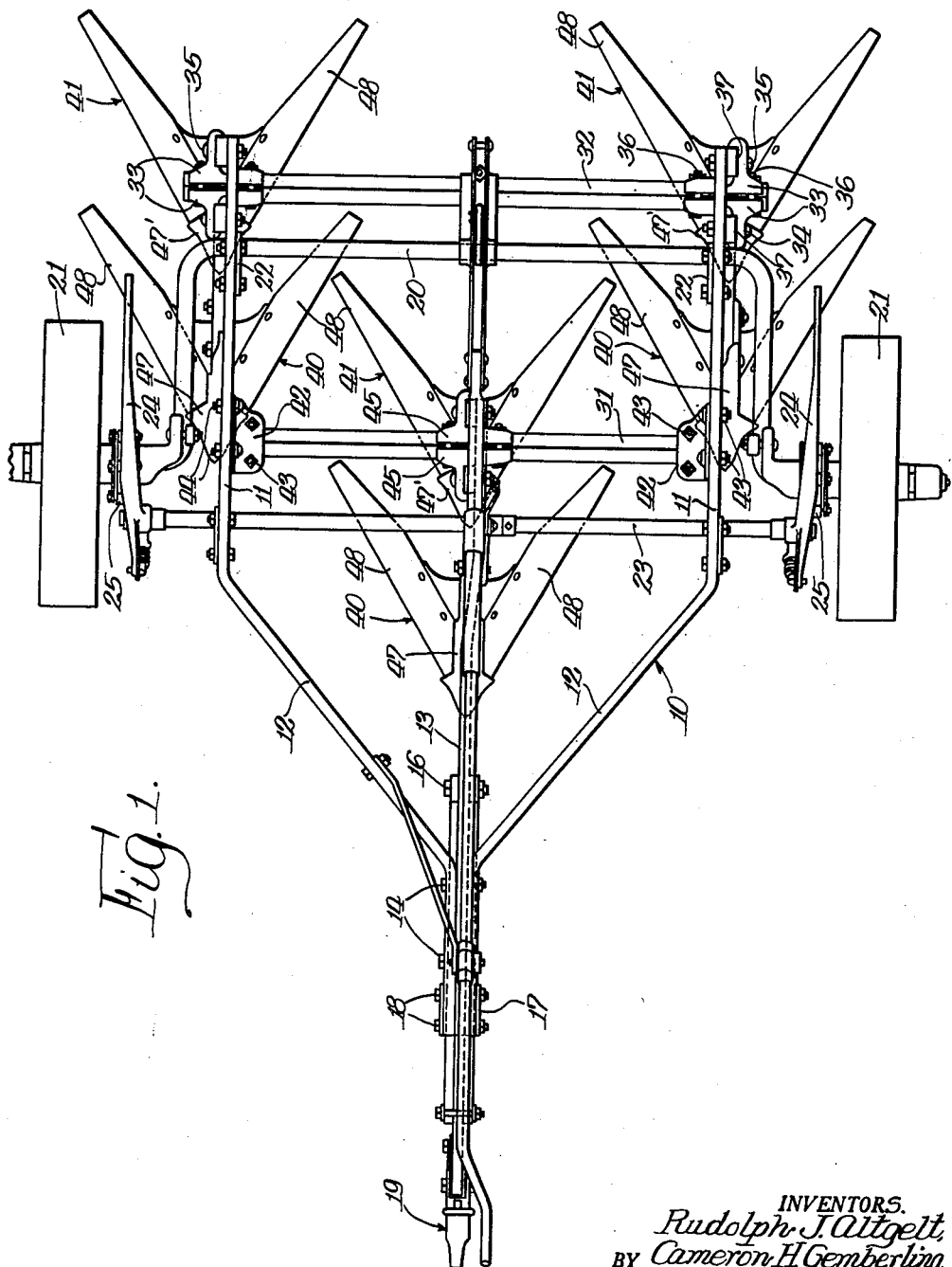
Fig. 1 is a top plan view of our improved combination subsurface and subsoil cultivator.

In carrying out our invention we have shown the same in connection with a main frame construction, generally indicated by the reference character 10, which comprises two longitudinally extending main frame members 11 which have their intermediate portions converging forwardly as shown at 12. The forward ends of these members 11 extend parallel and have secured between them a longitudinally extending center frame member 13 by means of bolts 14. The draft hitch, generally indicated by the reference character 15 is longitudinally adjustable for length for connecting the cultivator to the draft bar of various types of tractors and has its rear end bent upwardly and pivotally connected, as shown at 16, to the center frame member 13. The draft member hitch 15 is adjustable vertically between oppositely disposed depending plates 17 which have their upper ends secured to the forward ends of the frame member 12 by means of bolts 18. The forward end of the draft member 15 is provided with the usual spring actuated draft clevis, generally indicated by the reference character 19. The cultivator frame is supported in a substantially U-shaped crank axle 20 which has journaled on the outer ends the usual carrying wheels 21. The crank axle 20 is journaled in suitable bearing brackets 22 secured to the opposite frame members 11.

The power lift mechanism for lifting the implement out of the ground and the control therefor is substantially like the construction disclosed in the H. E. Altgelt Patent No. 2,359,600 issued October 3, 1944, on Plows with the exception that the two supporting wheels in the present implement are employed to raise the implement instead of a single wheel as shown in the aforementioned patent. For details of this mechanism reference to this patent may be had. The power lift in the present instance, comprises briefly a transverse rock shaft 23 which is journaled in suitable bearings of the opposite main frame members 11. Connected for limited oscillatable movement on the opposite ends of the rock shaft 23 are arcuate rack bars 24 which have teeth adapted to engage pinions 25 carried by the respective wheels 21. The rack bars are controlled and tripped by a lever and latch mechanism, generally indicated by the reference character 26. This control mechanism can be operated from the seat on the tractor by a cord extending to the lever of the tripping mechanism. The implement is held in its elevated or inoperative position by a locking bar 27 which has its rear end pivotally connected as shown at 28 to an intermediate portion of a lever 29. The lower end of the lever 29 is rigidly secured in the crank axle 20. The upper end of the lever 29 is connected by a manually operated screw adjustment, generally indicated by the reference character 30, which can be manipulated from the operator's seat on the tractor for regulating the depth penetration of the cultivating sweeps.

The above power lift mechanism and controls therefor has been briefly described, as a more detailed description and function and operation of this mechanism may be had by reference to the aforementioned patent.

One of the novel features of the present invention involves the novel means of supporting and positioning the subsurface and subsoil sweeps with respect to one another and with respect to the frame structure. The sweeps are supported on front and rear transverse shafts or bars 31 and 32 respectively, preferably of square cross section. The shaft 32 is secured to the rear ends of the main frame members 11 by front and rear clamp brackets 33 and bolts 34 and 35. The bar 32 extends into complementary recesses in the opposite brackets 33 and is clamped therein by means of clamping bolts 36. The brackets 33 have suitable recesses on the inner sides thereof as shown at 37 for receiving the forward and rearward standards 38 and 39 respectively of the subsurface and subsoil cultivating sweeps for clamping them between the frame members 11 and the brackets 33, as clearly shown in Figs. 1 and 2 of the drawings.

In this connection it will be noted that the cultivating sweeps are arranged in tandem, i. e., one directly behind the other, in three different longitudinal columns with the subsurface or front sweeps generally indicated by the reference character 40 and the subsoil sweeps positioned at a plane below and rearwardly of the front sweeps. The subsoil sweeps are generally indicated by the reference character 41. The front bar or shaft 31 is secured to the opposite main frame members 11 by brackets 42, U-shaped bolts 43 and bolts 44. The two sweeps 40 and 41 in the longitudinal center of the implement are rigidly secured to the longitudinal center of the bar 31 by clamp brackets 45, similar to the clamp brackets 33 on the bar 32. The lower ends of the clamp brackets 33 and 45 are reinforced by horizontal bars 45' secured thereto by bolts 46'. The vertical standard 39 of each of the subsoil sweeps 41 extend vertically downward and are provided with a plurality of uniformly spaced apart apertures as shown at 46 for adjusting the depth penetration of the subsoil sweeps 41 with respect to the subsurface sweeps 40. The standards 38 of each of the subsurface sweeps 40 are bent forwardly and have adjustably attached to the forward ends, pointed shoes 47. Secured to the shoes 47 are opposite and rearwardly diverging substantially horizontal shares 48. In a similar manner, adjustably secured to the lower ends of each of the standards 39 are shoes 47'. Secured to these shoes are opposite and rearwardly diverging substantially horizontal shares 48. In this connection it will be noted that by examining Fig. 1 of the drawings, that the horizontal shares 48 of the center subsurface sweep 40 overlap the path of travel of the next adjacent subsurface sweep 40 as to in effect cut a complete transverse slice of the soil beneath the surface thereof. Similarly, the center sweep 41 of the implement and its complementary or diverging shares 48 projects laterally beyond so as to overlap the path of travel of the next adjacent shares of the adjacent subsoil sweeps 41 so as to insure a second horizontal slice of the soil and thereby effect a complete crumbling or disruption of the soil to a considerable depth and thereby insure a breaking up of the impermeable layer of colloidal silt found in the subsoil.

From the above description it will be readily seen that by providing a subsurface cultivator in combination with subsoil sweeps so that the laterally projecting and diverging shares extend into the path of the adjacent sweeps, two horizontal slices of soil throughout the travel of the implement over the ground insures in effect a complete breaking up of the impermeable layer of colloidal silt and thereby prepares the soil for better penetration of the water, more even distribution of the same and an elimination or reduction of soil erosion.

In the modified form of our invention shown in Fig. 3 of the drawings, we have shown the rear subsoil sweep 41 attached to the main frame 10 and in substitution of the subsurface sweep, we have positioned a wheatland lister, generally indicated by the reference character 49. When this type of lister is substituted for each of the subsurface sweeps 40 in the implement shown in Figs. 1 and 2 of the drawings, the implement is particularly adapted to arid territories where wheatland listers are used to prepare the soil. In this type of cultivation, the surface of the land is left in lister furrows and ridges with some of the straw and trash left on top of the ridges and some of it mixed with the earth in the ridges. It will be obvious that various substitutions or modifications may be made such as adjusting the length of the shares of the subsurface sweeps while retaining the relatively long shares of the subsoil sweeps where different conditions require such modification.

It will be obvious from the above description that we have provided a very simple and efficient construction of subsurface cultivator in combination with subsoil sweeps which will more effectively and efficiently penetrate the subsoil by slicing two horizontal slices to disrupt the subsoil layer so as to afford better water penetration for even distribution and increased crop production and at the same time eliminate to a considerable extent, soil erosion.

While in the above specification we have described one embodiment which our invention may assume in practice, it will of course be understood that the same is capable of modification and that modification may be made without departing from the spirit and scope of the invention as expressed in the following claims.

What we claim as our invention and desire to secure by Letters Patent is:

1. A cultivator comprising a main frame, wheels for supporting said main frame, transverse bars secured to said frame, forward and rearward standards secured to and depending from said frame and bars, subsurface sweeps secured to the forward standards, subsoil sweeps secured to the rearward standards at a point below said subsurface sweeps, all of said sweeps of each kind being arranged in staggered relation with respect to the longitudinal center of said cultivator, laterally projecting shares forming each of said sweeps and overlapping the path of travel of the adjacent sweeps for cutting the soil into two slices extending across the entire width of said frame, and clamp brackets secured to said bars for securing said bars to said frame and for securing said standards to said bars and frame.

2. A cultivator comprising a main frame, wheels for supporting said main frame, transverse bars secured to said frame, forward and rearward standards secured to and depending from said frame and bars, subsurface sweeps secured to the forward standards, subsoil sweeps secured to the rearward standards at a point below the subsurface sweeps, all of said sweeps of each kind being arranged in staggered relation with respect to a longitudinal center line of said cultivator, substantially horizontally positioned rearwardly diverging shares forming each of said sweeps projecting laterally with respect thereto whereby the shares of the subsoil sweeps overlap the path of travel of the shares of the next adjacent subsoil sweeps for cutting said soil in two continuous slices across the width of said frame, and clamp brackets secured to said bars for securing said bars to said frame and for securing said standards to said bars and frame.

3. A cultivator comprising a main frame, wheels for supporting said frame, transverse bars secured to said frame, a plurality of cultivating sweeps supported on and depending from said bars and frame, said sweeps arranged in staggered relation with respect to a longitudinal center line of said frame and positioned to penetrate the soil to a certain horizontal depth, a second set of sweeps depending from said frame and rearwardly in alignment with said first named sweeps, said second set of sweeps positioned to penetrate the soil to a depth relatively greater than said first named sweeps, laterally projecting shares carried by said sweeps and adapted to overlap the path of the next adjacent sweeps for cutting said soil in two continuous slices across the width of said frame, and clamp brackets secured to said bars for securing said sweeps to said bars and for securing said bars to said frame.

RUDOLPH J. ALTGELT.
CAMERON H. GEMBERLING.

REFERENCES CITED

The following references are of record in the file of this patent:

UNITED STATES PATENTS

| Number | Name | Date |
| --- | --- | --- |
| 157,721 | Munger | Dec. 15, 1874 |
| 558,195 | Minor et al. | Apr. 14, 1896 |
| 1,437,032 | White | Nov. 28, 1922 |
| 1,645,507 | Moyer et al. | Oct. 11, 1927 |
| 2,180,618 | Strandlund | Nov. 21, 1939 |

FOREIGN PATENTS

| Number | Country | Date |
| --- | --- | --- |
| 560,628 | France | July 16, 1923 |